United States Patent
Peterson et al.

(10) Patent No.: US 10,921,643 B2
(45) Date of Patent: Feb. 16, 2021

(54) BACKLIGHTING DISPLAY APPARATUS

(71) Applicant: Rohinni, LLC, Coeur d'Alene, ID (US)

(72) Inventors: Cody Peterson, Hayden, ID (US); Andrew Huska, Liberty Lake, WA (US)

(73) Assignee: Rohinni, LLC, Coeur d'Alene, ID (US)

( * ) Notice: Subject to any disclaimer, the term of this patent is extended or adjusted under 35 U.S.C. 154(b) by 0 days.

(21) Appl. No.: 16/752,084

(22) Filed: Jan. 24, 2020

(65) Prior Publication Data
US 2020/0159069 A1    May 21, 2020

Related U.S. Application Data

(63) Continuation of application No. 15/393,108, filed on Dec. 28, 2016, now Pat. No. 10,545,372.

(51) Int. Cl.
*G02F 1/1335*    (2006.01)
*G02F 1/13357*   (2006.01)

(52) U.S. Cl.
CPC ............... *G02F 1/133603* (2013.01); *G02F 2001/133612* (2013.01); *G02F 2001/133613* (2013.01)

(58) Field of Classification Search
CPC .................................................. G02F 1/133603
See application file for complete search history.

(56) References Cited

U.S. PATENT DOCUMENTS

| | | | |
|---|---|---|---|
| 7,455,425 B2 | 11/2008 | Inoue et al. | |
| 8,109,644 B2 * | 2/2012 | Bierhuizen | G02B 6/0018 362/249.02 |
| 8,272,758 B2 * | 9/2012 | Meir | G02B 6/0021 362/230 |
| 8,755,005 B2 * | 6/2014 | Bierhuizen | G02B 6/0021 349/65 |
| 9,113,553 B2 * | 8/2015 | An | G02F 1/133305 |
| 9,442,243 B2 * | 9/2016 | Tarsa | G02B 6/0076 |
| 2002/0030996 A1 | 3/2002 | Sakakibara | |
| 2006/0087827 A1 | 4/2006 | Jung et al. | |
| 2009/0168401 A1 * | 7/2009 | Kwon | G02F 1/133611 362/97.1 |
| 2009/0256492 A1 * | 10/2009 | Lee | H05B 45/00 315/291 |
| 2010/0020267 A1 * | 1/2010 | Kobayashi | G02F 1/133603 349/64 |
| 2010/0053496 A1 * | 3/2010 | Park | G02F 1/133603 349/61 |

(Continued)

OTHER PUBLICATIONS

Final Office Action dated Apr. 18, 2019 for U.S. Appl. No. 15/393,108 "Backlighting Display Apparatus," Peterson, 11 pages.

(Continued)

*Primary Examiner* — Andrew J Coughlin
(74) *Attorney, Agent, or Firm* — Lee & Hayes, P.C.

(57) ABSTRACT

A backlighting apparatus for an LCD display includes a substrate and a circuit trace disposed on a surface of the substrate. The apparatus further includes a plurality of light sources affixed to the substrate via the circuit trace in a predetermined pattern across the surface of the substrate. Each light source includes one or more micro-sized, unpackaged LEDs. A height of the one or more micro-sized, unpackaged LEDs is from about 12 microns to about 200 microns.

18 Claims, 12 Drawing Sheets

(56) References Cited

U.S. PATENT DOCUMENTS

| | | | |
|---|---|---|---|
| 2010/0141167 A1* | 6/2010 | Kato | G02F 1/133603 |
| | | | 315/287 |
| 2011/0305021 A1* | 12/2011 | Xin | H01L 33/58 |
| | | | 362/249.02 |
| 2014/0268780 A1 | 9/2014 | Wang et al. | |
| 2015/0219324 A1* | 8/2015 | Kim | G02F 1/133603 |
| | | | 349/58 |
| 2015/0253623 A1* | 9/2015 | Lee | G02F 1/133504 |
| | | | 349/64 |
| 2015/0370130 A1 | 12/2015 | Lin | |
| 2015/0373793 A1 | 12/2015 | Bower et al. | |
| 2016/0203742 A1 | 7/2016 | Peterson et al. | |
| 2016/0218264 A1* | 7/2016 | Tischler | H01L 24/75 |
| 2017/0023806 A1* | 1/2017 | Wehlus | G02F 1/0126 |
| 2018/0180942 A1 | 6/2018 | Peterson et al. | |

OTHER PUBLICATIONS

Office Action for U.S. Appl. No. 15/393,108, dated Oct. 4, 2018, Peterson et al, "Backlighting Display Apparatus," 8 pages.
International Preliminary Report on Patentability dated Jul. 11, 2019 for PCT Application No. PCT/IB2017/050649, 6 pages.

* cited by examiner

BACKLIGHTING DISPLAY APPARATUS

CROSS REFERENCE TO RELATED PATENT APPLICATIONS

This application is a continuation of and claims priority to U.S. patent application Ser. No. 15/393,108, filed on Dec. 28, 2016, the disclosure of which incorporates U.S. patent application Ser. No. 14/939,896, filed on Nov. 12, 2015, entitled "Apparatus for Transfer of Semiconductor Devices;" U.S. patent application Ser. No. 15/360,645, filed on Nov. 23, 2016, entitled "Pattern Array Direct Transfer Apparatus and Method Therefor;" and U.S. Pat. No. 9,502,625, entitled "Electrophotographic Deposition of Unpackaged Semiconductor Device," in their entireties by reference.

BACKGROUND

The fabrication of semiconductor devices, such as light-emitting diodes ("LEDs"), typically involves an intricate manufacturing process with a myriad of steps. The conventional end-product of the fabrication is a "packaged" semiconductor device. The "packaged" modifier refers to the enclosure and protective features built into the final product as well as the interface that enables the device in the package to be incorporated into a circuit.

The conventional fabrication process for semiconductor devices starts with handling a semiconductor wafer. The wafer is diced into a multitude of "unpackaged" semiconductor devices. The "unpackaged" modifier refers to an unenclosed semiconductor device without packaging features. Herein, unpackaged semiconductor devices may be called semiconductor device dies, or just "dies" for simplicity. A single semiconductor wafer may be diced to create dies of various sizes, so as to form upwards of more than 100,000 or even 1,000,000 dies from the semiconductor wafer (depending on the starting size of the semiconductor), and each die has a certain quality. The unpackaged dies are then "packaged" via a conventional fabrication process discussed briefly below. The actions between the wafer handling and the packaging may be referred to as "die preparation."

In some instances, the die preparation may include sorting the dies via a "pick and place process," whereby diced dies are picked up individually and sorted into bins. The sorting may be based on the forward voltage capacity of the die, the average power of the die, and/or the wavelength of the die.

Typically, the packaging involves mounting a die into a plastic or ceramic package (e.g., mold or enclosure). The packaging also includes connecting the die contacts to pins/wires for interfacing/interconnecting with ultimate circuitry. The packaging of the semiconductor device is generally completed by sealing the die to protect it from the environment (e.g., dust).

A product manufacturer then places packaged dies in product circuitry. Due to the packaging, the dies are ready to be "plugged in" to the circuit assembly of the product being manufactured. Additionally, while the packaging of the dies protects them from elements that might degrade or destroy the dies, the packaged dies are inherently larger (e.g., in some cases, around 10 times the thickness and 10 times the area, resulting in 100 times the volume) than the unpackaged dies. Thus, the resulting assembly cannot be any thinner than the packaging of the semiconductor dies.

The thickness and overall size of the ultimate circuit assemblies including semiconductor devices has ramifications in multiple areas of technology. In the display industry for devices ranging from cell phones to televisions, for example, there is a drive to make the displays as thin as possible while simultaneously improving efficiency and quality of the displays. Some factors that continue to influence the thickness of the LED backlit LCD displays include: LEDs are relatively large, packaged LEDs; thick lenses that cover the LEDs between the optical substrates and the surface of the product substrate to which the LEDs are attached; inability to manufacture a thin LCD display using unpackaged dies in a cost-effective, qualitative, quantitative, uniform, and mass-reproducible manner; etc. For example, current industry techniques of LED backlighting for LCD displays include attaching (or possibly forming) a thick, preformed lens made of plastic, resin, or other materials over packaged LEDs on a circuit substrate. Such lenses may be as thick (tall) as 15 mm or more, and as wide (lateral diameter) as 35 mm or more. Further, the packaged LEDs are spaced significant distances apart to reduce heat and cost, including as much 40 mm and more between adjacent lenses of the attached LEDs. As such, the size (thickness) of the air gap between the backside of the optical substrates and the LEDs (and associated lenses) is significant, on the order of as much as 1-2 cm or more, in order to diffuse the emitted light sufficiently to minimize "hot spots" where the light shines brightly too close to the backside of the optical substrates and ends up creating a non-uniform brighter spot in the display device.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

This disclosure is directed to a display backlighting apparatus. More specifically, the display backlighting apparatus provides an array of closely spaced micro LEDs, which may include unpackaged semiconductor dies, to be used for backlighting a display screen in a manner that achieves far superior luminescence and contrast ratio control than is possible using conventional backlighting with packaged dies. Further, the apparatus of the instant application achieves the above advantages in a more power efficient and significantly thinner structure.

The display backlighting apparatus may be manufactured in a variety of ways. For example, in an embodiment, the display backlighting apparatus may be created using a machine that precisely positions, directly transfers, and accurately affixes unpackaged semiconductor dies from a diced semiconductor wafer to a circuit substrate. In some instances, embodiments of the machines described in U.S. patent application Ser. No. 14/939,896, U.S. patent application Ser. No. 15/360,645, and/or U.S. Pat. No. 9,502,625, may be used to manufacture the display backlighting apparatus. In general, the amount of time and/or cost to manufacture the display backlighting apparatus using a machine from the above-identified embodiments may be reduced significantly when compared to conventional machines and methods of fabrication of backlighting devices. Further, the use of unpackaged dies, placed with or without the above-mentioned machine, may significantly reduce the thickness of a backlit display compared to a backlit display produced using conventional packaged LEDs and/or conventional means.

In this description, the term "substrate" may refer to a layer of any material used as a foundation for the placement and securement to which a light generating source, such as an LED, may be placed. That is, the substrate of the display backlighting apparatus may be of varying size and thickness, and the material selected may include circuit boards (PCB), metal sheets, polymer sheets, etc.

Dies, such as unpackaged LEDs that are contemplated for use in the display backlighting apparatus are extremely small and thin. For example, the thickness of an unpackaged die (e.g., height that a die extends above a surface) may range from about 12 microns to about 400 microns, and a lateral dimension of a die may range from about 20 microns to about 800 microns. Due to the small size of the dies relative to the size of the substrate, the challenge of precisely aligning and placing the dies may be alleviated by using a machine such as that discussed above.

Example Embodiment of a Direct Transfer Apparatus

Figure 1:
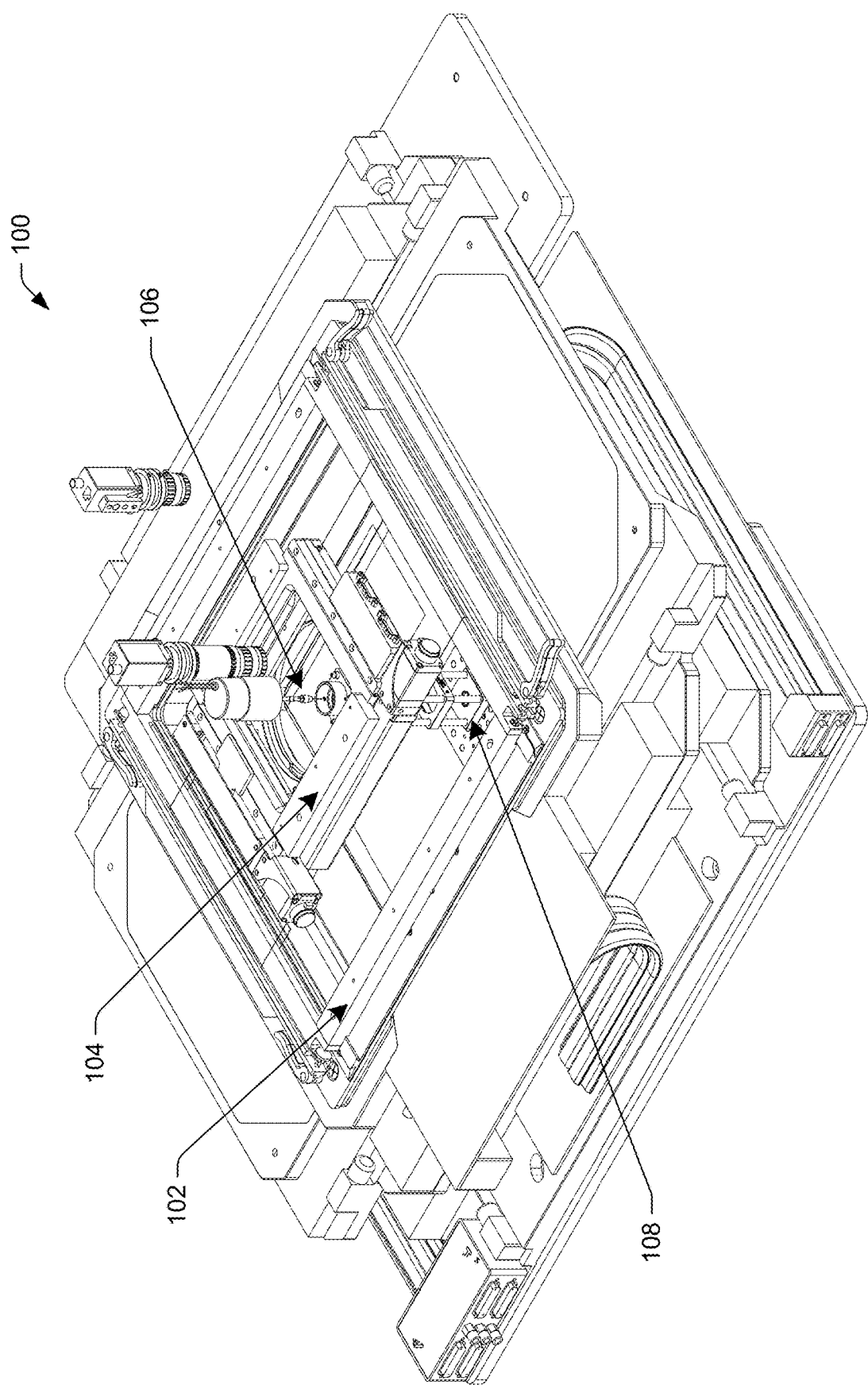
FIG. 1 illustrates an isometric view of an embodiment of a transfer apparatus according to an embodiment of this application.

FIG. 1 illustrates an embodiment of an apparatus 100 that may be used to directly transfer unpackaged semiconductor components (or "dies") from a wafer tape to a product substrate. The wafer tape may also be referred to herein as the semiconductor device die substrate, or simply a die substrate. The apparatus 100 may include a product substrate conveyance mechanism 102 and a wafer tape conveyance mechanism 104. Each of the product substrate conveyance mechanism 102 and the wafer tape conveyance mechanism 104 may include a frame system or other means to secure the respective substrates to be conveyed to desired alignment positions with respect to each other. The apparatus 100 may further include a transfer mechanism 106, which, as shown, may be disposed vertically above the wafer tape conveyance mechanism 104. In an embodiment, the transfer mechanism 106 may be located so as to nearly contact the wafer substrate. Additionally, the apparatus 100 may include a fixing mechanism 108. The fixing mechanism 108 may be disposed vertically beneath the product substrate conveyance mechanism 102 in alignment with the transfer mechanism 106 at a transfer position, where a die may be placed on the product substrate. As discussed below, FIGS. 2A and 2B illustrate example details of the apparatus 100.

Figure 2A:
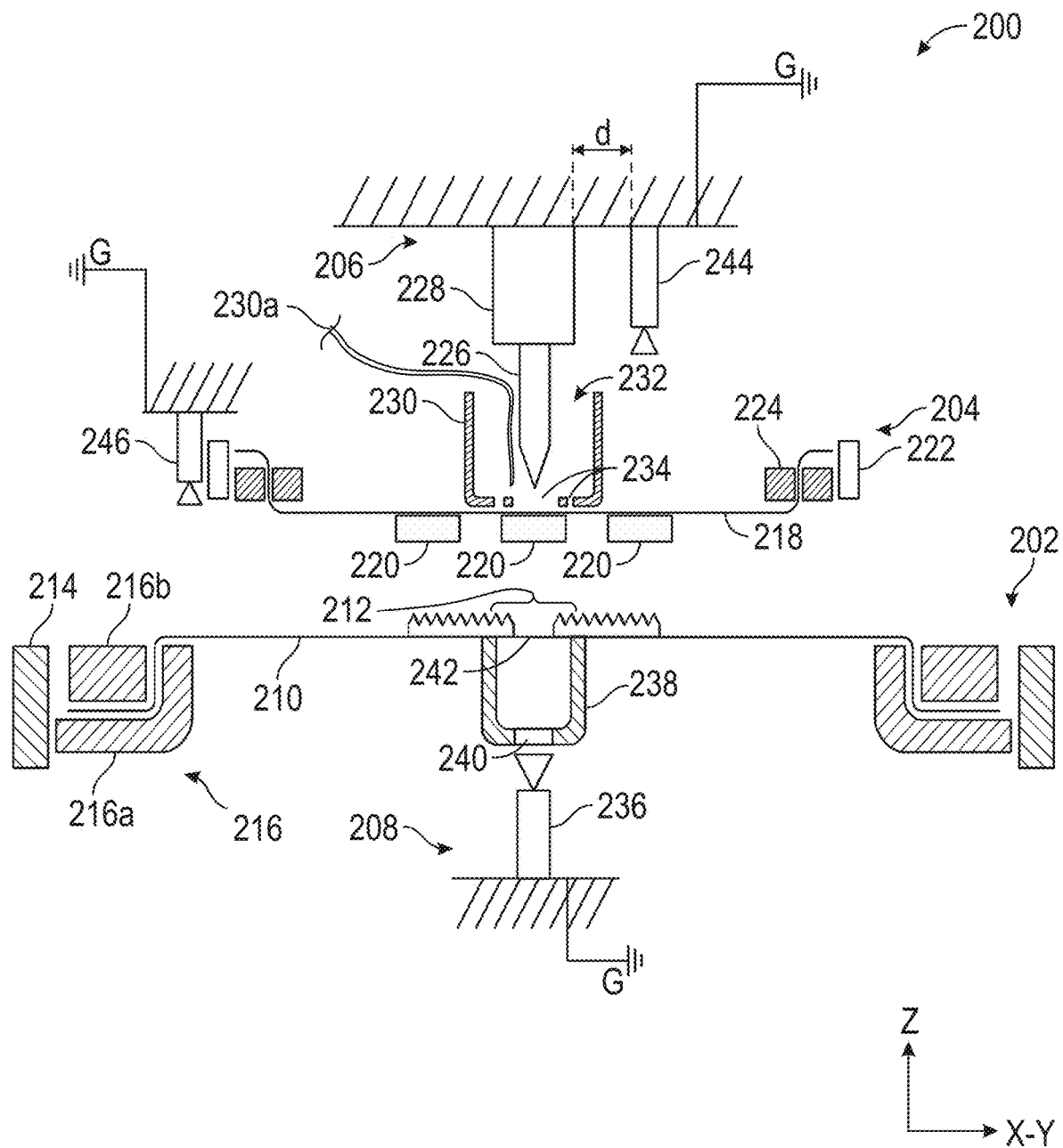
FIG. 2A represents a schematic view of an embodiment of a transfer apparatus in a pre-transfer position according to an embodiment of this application.
Figure 2B:
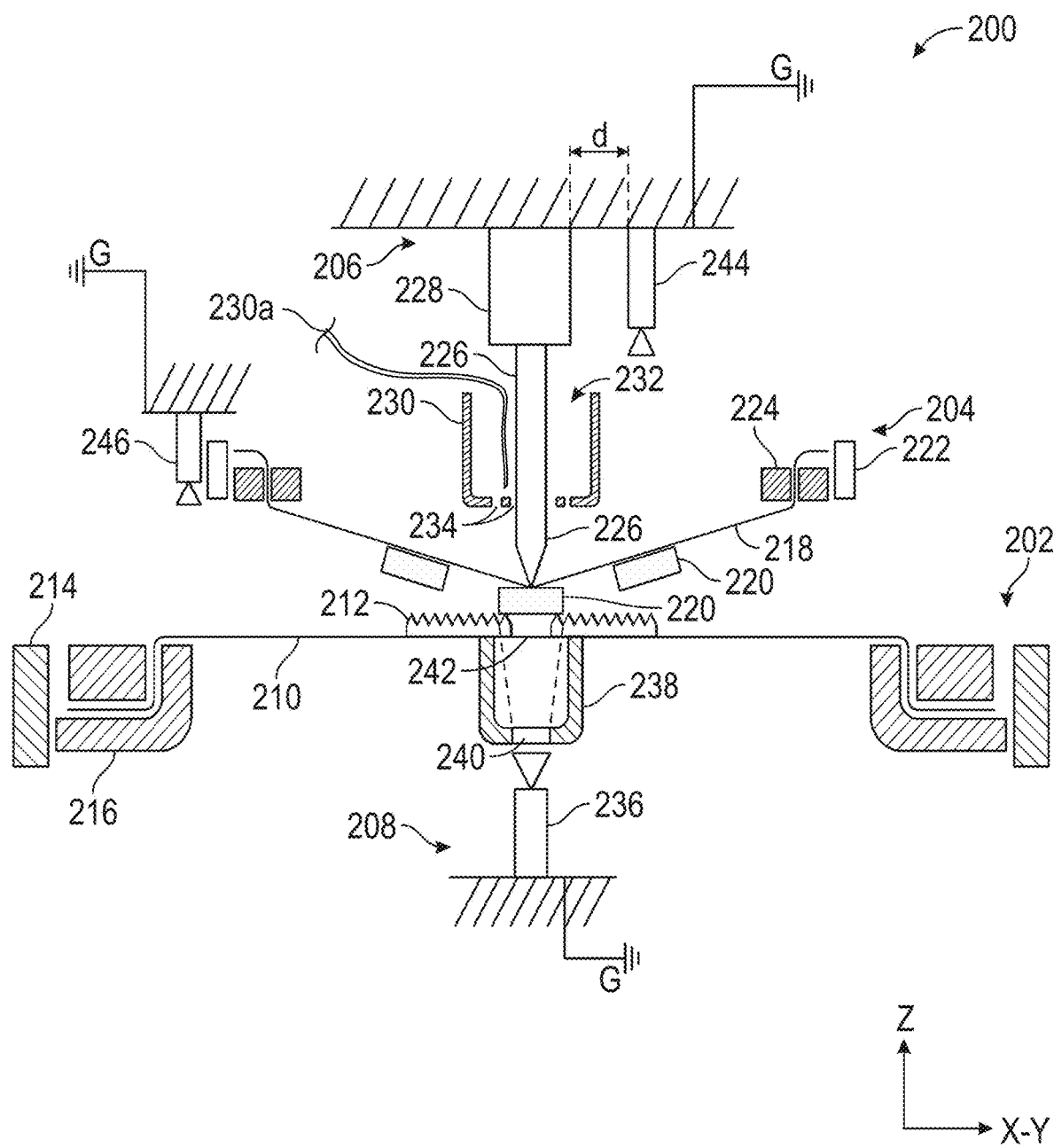
FIG. 2B represents a schematic view of an embodiment of a transfer apparatus in a transfer position according to an embodiment of this application.

Inasmuch as FIGS. 2A and 2B depict different stages of the transfer operation, while referring to the same elements and features of apparatus 200, the following discussion of specific features may refer interchangeably to either or both of FIGS. 2A and 2B, except where explicitly indicated. In particular, FIGS. 2A and 2B illustrate an embodiment of an apparatus 200, including a product substrate conveyance mechanism 202, a wafer tape conveyance mechanism 204, a transfer mechanism 206, and a fixing mechanism 208. The product substrate conveyance mechanism 202 may be disposed adjacent to the wafer tape conveyance mechanism 204. For example, as illustrated, the product substrate conveyance mechanism 202 may extend in a substantially horizontal direction and may be disposed vertically beneath the wafer tape conveyance mechanism 204 so as to take advantage of any effect that gravity may have in the transfer process. Alternatively, the product substrate conveyance mechanism 202 may be oriented so as to extend transversely to a horizontal plane.

During a transfer operation, the conveyance mechanisms 202, 204 may be positioned such that a space between a surface of a product substrate carried by the product substrate conveyance mechanism 202 and a surface of a wafer tape carried by the wafer tape conveyance mechanism 204 may be more or less than 1 mm, depending on various other aspects of the apparatus 200, including the amount of deflection that occurs by components during the transfer operation, as described herein below. In an embodiment, the respective opposing surfaces of the wafer tape and the product substrate may be the most prominent structures in comparison to the supporting structures of both of the conveyance mechanisms 202, 204. That is, in order to avoid a collision between components of the machine and products thereon, which might be caused by movable parts (e.g., both of the conveyance mechanisms 202, 204), a distance between the respective surfaces of the wafer tape and product substrate may be less than a distance between either of the surfaces and any other opposing structural component.

As depicted, and In an embodiment, the transfer mechanism 206 may be disposed vertically above the wafer tape conveyance mechanism 204, and the fixing mechanism 208 may be disposed vertically beneath the product substrate conveyance mechanism 202. It is contemplated that in some embodiments, one or both of the transfer mechanism 206 and the fixing mechanism 208 may be oriented in different positions than the positions illustrated in FIGS. 2A and 2B. For example, the transfer mechanism 206 may be disposed so as to extend at an acute angle with respect to a horizontal plane. In another embodiment, the fixing mechanism 208 may be oriented to emit energy during the transfer process from the same direction of actuation as the transfer mechanism 206, or alternatively, from any orientation and position from which the fixing mechanism 208 is able to participate in the transfer process.

The product substrate conveyance mechanism 202 may be used to secure a product substrate 210. Herein, the term "product substrate" may include, but is not limited to: a wafer tape (for example, to presort the dies and create sorted die sheets for future use); a paper or polymer substrate formed as a sheet or other non-planar shape, where the polymer—translucent or otherwise—may be selected from any suitable polymers, including, but not limited to, a silicone, an acrylic, a polyester, a polycarbonate, etc.; a circuit board (such as a printed circuit board (PCB)); a string or thread circuit, which may include a pair of conductive wires or "threads" extending in parallel; and a cloth material of cotton, nylon, rayon, leather, etc. The choice of material of the product substrate may include durable materials, flexible materials, rigid materials, and other materials with which the transfer process is successful and which maintain suitability for the end use of the product substrate. The product substrate 210 may be formed solely or at least partially of conductive material such that the product substrate 210 acts as a conductive circuit for forming a product. The potential types of product substrate may further include items, such as glass bottles, vehicle windows, or sheets of glass. In an embodiment, the thickness of product substrate 210 may range from about 25 to about 775 microns. Moreover, product substrate 210 thickness may range from about 100 microns to about 650 microns, from about 200 microns to about 400 microns; and the thickness may even be less than 25 microns or greater than 775 microns.

In an embodiment as depicted in FIGS. 2A and 2B, the product substrate 210 may include a circuit trace 212 disposed thereon. The circuit trace 212, as depicted, may include a pair of adjacent trace lines spaced apart by a trace spacing, or gap so as to accommodate a distance between electrical contact terminals (not shown) on the dies being transferred. Thus, the trace spacing, or gap between the adjacent trace lines of the circuit trace 212 may be sized according to the size of the die being transferred to ensure proper connectivity and subsequent activation of the die. For example, the circuit trace 212 may have a trace spacing, or gap ranging from about 75 to 200 microns, about 100 to 175 microns, or about 125 to 150 microns.

The circuit trace 212 may be formed from a conductive ink disposed via screen printing, inkjet printing, laser printing, manual printing, or other printing means. Further, the circuit trace 212 may be pre-cured and semi-dry or dry to provide additional stability, while still being activatable for die conductivity purposes. A wet conductive ink may also be used to form the circuit trace 212, or a combination of wet and dry ink may be used for the circuit trace 212. Alternatively, or additionally, the circuit trace 212 may be pre-formed as a wire trace, or photo-etched, or from molten material formed into a circuit pattern and subsequently adhered, embedded, or otherwise secured to the product substrate 210.

The material of the circuit trace 212 may include, but is not limited to, silver, copper, gold, carbon, conductive polymers, etc. In an embodiment, the circuit trace 212 may include a silver-coated copper particle. A thickness of the circuit trace 212 may vary depending on the type of material used, the intended function and appropriate strength or flexibility to achieve that function, the energy capacity, the size of the LED, etc. For example, a thickness of the circuit trace may range from about 5 microns to 40 microns, from about 15 microns to 30 microns, or from about 12 microns to 20 microns.

Accordingly, in one non-limiting example, the product substrate 210 may be a flexible, translucent polyester sheet having a desired circuit pattern screen printed thereon using a silver-based conductive ink material to form the circuit trace 212.

The product substrate conveyance mechanism 202 may include a product substrate conveyor frame 214 for securing a product substrate holder frame 216. The structure of the product substrate holder frame 216 may vary significantly depending on the type and properties (e.g., shape, size, elasticity, etc.) of the product substrate being used. Inasmuch as the product substrate 210 may be a flexible material, product substrate 210 may be held under tension in the product substrate holder frame 216, so as to create a more rigid surface upon which a transfer operation, discussed herein below, is performed. In the above example, the rigidity created by the tension in the product substrate 210 may increase the placement accuracy when transferring components.

In an embodiment, using a durable or more rigid material for the product substrate 210, naturally provides a firm surface for component placement accuracy. In contrast, when the product substrate 210 is allowed to sag, wrinkles and/or other discontinuities may form in the product substrate 210 and interfere with the pre-set pattern of the circuit trace 212, to the extent that the transfer operation may be unsuccessful.

While the means of holding the product substrate 210 may vary greatly, FIG. 2A illustrates an embodiment of a product substrate holder frame 216 including a first portion 216a having a concave shape and a second portion 216b having a convex counter shape that corresponds in shape to the concave shape. In the depicted example, tension is created for the product substrate 210 by inserting an outer perimeter of the product substrate 210 between the first portion 216a and the second portion 216b to thereby clamp the product substrate 210 tightly.

The product substrate conveyor frame 214 may be conveyed in at least three directions—two directions in the horizontal plane and vertically as well. The conveyance may be accomplished via a system of motors, rails, and gears (none of which are shown). As such, the product substrate tensioner frame 216 may be conveyed to and held in a specific position as directed and/or programmed and controlled by a user of the apparatus 200.

The wafer tape conveyance mechanism 204 may be implemented to secure a wafer tape 218 having dies 220 (i.e., semiconductor device dies) thereon. The wafer tape 218 may be conveyed in multiple directions to the specific transfer positions for the transfer operation via a wafer tape conveyor frame 222. Similar to the product substrate conveyor frame 214, the wafer tape conveyor frame 222 may include a system of motors, rails, and gears (none of which are shown).

The unpackaged semiconductor dies 220 for transfer may be extremely small. Indeed, the height of the dies 220 may range from about 12 to about 200 microns, or from about 25 to about 100 microns, or from about 50 to about 80 microns.

Due to the micro-size of the dies, when the wafer tape 218 has been conveyed to the appropriate transfer position, a gap spacing between the wafer tape 218 and the product substrate 210 may range from about 0.25 mm to about 1.50 mm, or about 0.50 mm to about 1.25 mm, or about 0.75 mm to about 1.00 mm, for example. A minimum gap spacing may depend on factors including: a thickness of the die being transferred, a stiffness of the wafer tape involved, an amount of deflection of the wafer tape needed to provide adequate capture and release of the die, a proximity of the adjacent dies, etc. As the distance between the wafer tape 218 and the product substrate 210 decreases, a speed of the transfer operation may also decrease due to the reduced cycle time (discussed further herein) of the transfer operation. Such a decrease in the duration of a transfer operation may therefore increase a rate of die transfers. For example, the die transfer rate may range from about 6-20 dies placed per second, or more.

Furthermore, the wafer tape conveyor frame 222 may secure a wafer tape holder frame 224, which may stretch and hold the wafer tape 218 under tension. As illustrated in FIG. 2A, the wafer tape 218 may be secured in the wafer tape holder frame 224 via clamping a perimeter of the wafer tape 218 between adjacent components of the wafer holder frame 224. Such clamping assists in maintaining the tension and stretched characteristic of the wafer tape 218, thereby increasing the success rate of the transfer operation. In view of the varying properties of different types/brands/qualities of wafer tapes available, a particular wafer tape may be selected for use based on an ability to consistently remain at a desired tension during a transfer process. In an embodiment, the needle actuation performance profile may change depending on the tension of the wafer tape 218.

The material used for the wafer tape 218 may include a material having elastic properties, such as a rubber or silicone, for example. Furthermore, inasmuch as temperature of the environment and the wafer tape 218 itself may contribute to potential damage to the wafer tape 218 during the transfer process, a material having properties that are resistant to temperature fluctuation may be advantageous. Additionally, in an embodiment, the wafer tape 218 may be stretched slightly so as to create a separation or gap between individual dies 220 to assist in the transfer operation. A surface of the wafer tape 218 may include a sticky substance via which the dies 220 may be removably adhered to the wafer tape 218.

The dies 220 on the wafer tape 218 may include dies that were individually cut from a solid semiconductor wafer and then placed onto the wafer tape 218 to secure the dies. In such a situation, the dies may have been pre-sorted and explicitly organized on the wafer tape 218, in order, for example, to assist in the transfer operation. In particular, the dies 220 may be arranged sequentially as to the expected order of transfer to the product substrate 210. Such pre-arrangement of the dies 220 on the wafer tape 218 may reduce the amount of travel that would otherwise occur between the product substrate conveyance mechanism 202 and the wafer tape conveyance mechanism 204. Additionally, or alternatively, the dies on the wafer tape 218 may have been pre-sorted to include only dies having substantially equivalent performance properties. In this case, efficiency of the supply chain may be increased and thus, travel time of the wafer tape conveyance mechanism 204 may be reduced to a minimum.

In some instances, materials used for the dies may include, but is not limited to, silicon carbide, gallium nitride, a coated silicon oxide, etc. Furthermore, sapphire or silicon may be used as a die as well. Additionally, as indicated above, a "die" may be representative herein of an electrically actuatable element generally.

In some embodiments, the wafer tape 218 may include dies that are not pre-sorted, but rather are formed by simply cutting a semiconductor directly on wafer tape, and then leaving the dies on the wafer tape without "picking and placing" to sort the dies depending on the respective performance quality of the dies. In such a situation, the dies on the wafer tape may be mapped to describe the exact relative locations of the different quality dies. Therefore, in some instances, it may be unnecessary to use wafer tape having pre-sorted dies. In such a case, the amount of time and travel for the wafer tape conveyance mechanism 204 to move between particular dies for each sequential transfer operation may increase. This may be caused in part by the varying quality of the dies dispersed within the area of the semiconductor, which means that a die of a specific quality for the next transfer operation may not be immediately adjacent to the previously transferred die. Thus, the wafer tape conveyance mechanism 204 may move the wafer tape 218 further to align an appropriate die of a specific quality for transfer than would be necessary for a wafer tape 218 containing dies of substantially equivalent quality.

In further regard to the dies 220 on the wafer tape 218, in some instances, a data map of the dies 220 may be provided with the wafer tape 218. The data map may include a digital file providing information that describes the specific quality and location of each die on the wafer tape 218. The data map file may be input into a processing system in communication with the apparatus 200, whereby the apparatus 200 may be controlled/programmed to seek the correct die 220 on the wafer tape 218 for transfer to the product substrate 210.

A transfer operation is performed, in part, via the transfer mechanism 206, which is a die separation device for assisting in separation of dies from the wafer tape 218. The actuation of the transfer mechanism 206 may cause one or more dies 220 to be released from the wafer tape 218 and to be captured by the product substrate 210. In an embodiment, the transfer mechanism 206 may operate by pressing a transfer element 226 which may be an elongated rod, such as a pin or a needle into a top surface of the wafer tape 218 against a die 220. For convenience, the transfer element 226 may be referred to hereinafter as "the needle 226." The needle 226 may be connected to a transfer element actuator, such as needle actuator 228. The needle actuator 228 may include a motor connected to the needle 226 to drive the needle 226 toward the wafer tape 218 at predetermined/programmed times.

In view of the function of the needle 226, the needle 226 may include a material that is sufficiently durable to withstand repetitive, rapid, minor impacts while minimizing potential harm to the dies 220 upon impact. For example, the needle 226 may include a metal, a ceramic, a plastic, etc. Additionally, a tip of the needle 226 may have a particular shape profile, which may affect the ability of the needle to function repetitively without frequently breaking either the tip or damaging the wafer tape 218 or the dies 220.

In a transfer operation, the needle 226 may be aligned with a die 220, as depicted in FIG. 2A, and the needle actuator may move the needle 226 to push against an adjacent side of the wafer tape 218 at a position in which the die 220 is aligned on the opposing side of the wafer tape 218, as depicted in FIG. 2B. The pressure from the needle 226 may cause the wafer tape 218 to deflect so as to extend the die 220 to a position closer to the product substrate 226 than adjacent dies 220, which are not being transferred. As indicated above, the amount of deflection may vary depending several factors, such as the thickness of the die and circuit trace. For example, where a die 220 is about 50 microns thick and circuit trace 212 is about 10 microns thick, an amount of deflection of the wafer tape 218 may be about 75 microns. Thus, the die 220 may be pressed via the needle 226 toward the product substrate 210 to the extent that the electrical contact terminals (not shown) of the die are able to bond with the circuit trace 212, at which point, the transfer operation proceeds to completion and the die 220 is released from the wafer tape 218.

In an embodiment, the transfer mechanism 206 may further include a needle retraction support 230, (also known as a pepper pot). In an embodiment, the support 230 may include a structure having a hollowed space wherein the needle 226 may be accommodated by passing into the space via an opening 232 in a first end of the support 230. The support 230 may further include at least one opening 234 on a second opposing end of the support 230. Moreover, the support may include multiple perforations near opening 234. The at least one opening 234 may be sized with respect to a diameter of the needle 226 to accommodate passage of the needle 226 therethrough so as to press on the wafer tape 218 during the transfer process.

Additionally, in an embodiment, the support 230 may be disposed adjacent to the upper surface of the wafer tape 218. As such, when the needle 226 is retracted from pressing on the wafer tape 218 during a transfer operation, a base surface of the support 230 (having the at least one opening 234 therein) may come into contact with the upper surface of the wafer tape 218, thereby preventing upward deflection of the wafer tape 218. This upward deflection may be caused in the event where the needle 226 pierces at least partially into the wafer tape 218, and while retracting, the wafer tape is stuck to the tip of the needle 226. Thus, the support 230 may reduce the time it takes to move to the next die 220. A wall perimeter shape of the support 230 may be cylindrical or any other shape that may be accommodated in the apparatus 200. Accordingly, the support 230 may be disposed between the needle 226 and an upper surface of the wafer tape 218.

With respect to the effect of temperature on the integrity of the wafer tape 218, it is contemplated that a temperature of support 230 may be adjusted so as to regulate the temperature of the needle 226 and the wafer tape 218, at least near the point of the transfer operation. Accordingly, the temperature of the support 230 may be heated or cooled, and a material of the support 230 may be selected to maximize thermal conductivity. For example, the support 230 may be formed of aluminum, or another relatively high thermal conductivity metal or comparable material, whereby the temperature may be regulated to maintain consistent results of the transfer operations. In an embodiment, air may be circulated within the support 230 to assist in regulating the temperature of a local portion of the wafer tape 218. Additionally, or alternatively, a fiber optic cable 230*a* may be inserted into the needle retraction support 230, and may further be against the needle 226 to assist in temperature regulation of the wafer tape 218 and/or the needle 226.

As indicated above, fixing mechanism 208 may assist in affixing the die 220 to the circuit trace 212 on a surface of the product substrate 210. FIG. 2B illustrates the apparatus 200 in a transfer stage, where the die 220 is pushed against the circuit trace 212. In an embodiment, fixing mechanism 208 may include an energy-emitting device 236 including, but not limited to, a laser, electromagnetic radiation, pressure vibration, ultrasonic welding, etc. In an embodiment, the use of pressure vibration for the energy-emitting device 236 may function by emitting a vibratory energy force so as to cause disruption of the molecules within the circuit trace against those of the electrical contact terminals so as to form a bond via the vibratory pressure.

In a non-limiting example, as depicted in FIG. 2B, a laser may be implemented as the energy-emitting device 236. During a transfer operation, laser 236 may be activated to emit a specific wavelength and intensity of light energy directed at the die 220 being transferred. The wavelength of the light of the laser 236 may be selected specifically based on the absorption of that wavelength of light with respect to the material of the circuit trace 212 without significantly affecting the material of the product substrate 210. For example, a laser having an operational wavelength of 808 nm, and operating at 5 W may be readily absorbed by silver, but not by polyester. As such, the laser beam may pass through the substrate of polyester and affect the silver of a circuit trace. Alternatively, the wavelength of laser may match the absorption of the circuit trace and the material of the substrate. The focus area of the laser 236 (indicated by the dashed lines emanating vertically from the laser 236 in FIG. 2B toward the product substrate 210) may be sized according to the size of the LED, such as for example, a 300 micron wide area.

Upon actuation of a predetermined controlled pulse duration of the laser 236, the circuit trace 212 may begin to cure (and/or melt or soften) to an extent that a fusing bond may form between the material of the circuit trace 212 and the electrical contact terminals (not shown) on the die 220. This bond further assists in separating the unpackaged die 220 from the wafer tape 218, as well as simultaneously affixing the die 220 to the product substrate 210. Additionally, the laser 236 may cause some heat transfer on the wafer tape 218, thereby reducing adhesion of the die 220 to the wafer tape 218 and thus assisting in the transfer operation.

In other instances, dies may be released and fixed to the product substrates in many ways, including using a laser having a predetermined wavelength or a focused light (e.g., IR, UV, broadband/multi spectral) for heating/activating circuit traces to thereby cure an epoxy or phase change bond materials, or for deactivating/releasing a die from wafer tape, or for initiating some combination of reactions. Additionally, or alternatively, a specific wavelength laser or light may be used to pass through one layer of the system and interact with another layer. Furthermore, a vacuum may be implemented to pull a die from the wafer tape, and air pressure may be implemented to push the die onto a product substrate, potentially including a rotary head between the die wafer substrate and the product substrate. In yet another instance, ultrasonic vibration may be combined with pressure to cause the die to bond to the circuit traces.

Similar to the needle retraction support 230, the fixing mechanism may also include a product substrate support 238, which may be disposed between the laser 236 and the bottom surface of the product substrate 210. The support 238 may include an opening 240 at a base end thereof and an opening 242 at an upper end thereof. For example, the support 238 may be formed as a ring or hollow cylinder. The support 238 may further include structure to secure a lens (not shown) to assist in directing the laser. The laser 236 emits the light through the openings 240, 242 to reach the product substrate 210. Furthermore, the upper end of the sidewalls of the support 238 may be disposed in direct contact with or closely adjacent to the bottom surface of the product substrate 210. Positioned as such, the support 238 may help to prevent damage from occurring to the product substrate 210 during the stroke of the needle 226 at the time of a transfer operation. In an embodiment, during the transfer operation, the portion of the bottom surface of the product substrate 210 that is aligned with the support 238 may contact the support 238, which thereby provides resistance against the incoming motion of the die 220 being pressed by the needle 226. Moreover, the support 238 may be movable in a direction of the vertical axis to be able to adjust a height thereof so as to raise and lower support 238 as necessary, including to a height of the product substrate 210.

In addition to the above features, apparatus 200 may further include a first sensor 244, from which apparatus 200 receives information regarding the dies 220 on the wafer tape 218. In order to determine which die is to be used in the transfer operation, the wafer tape 218 may have a bar code (not shown) or other identifier, which is read or otherwise detected. The identifier may provide die map data to the apparatus 200 via the first sensor 244.

As shown in FIGS. 2A and 2B, the first sensor 244 may be positioned near the transfer mechanism 206 (or the needle 226 specifically), spaced apart from the transfer mechanism 206 by a distance d, which may range from about 1-5 inches, so as to enhance the accuracy of location detection. In an alternative embodiment, first sensor 244 may be disposed adjacent the tip of the needle 226 in order to sense the exact position of the dies 220 in real time. During the transfer process, the wafer tape 218 may be punctured and or further stretched over time, which may alter the previously mapped, and thus expected, locations of the dies 220 on the wafer tape 218. As such, small changes in the stretching of the wafer tape 218 could add up to significant errors in alignment of the dies 220 being transferred. Thus, real time sensing may be implemented to assist in accurate die location.

In an embodiment, the first sensor 244 may be able to identify the precise location and type of die 220 that is being sensed. This information may be used to provide instructions to the wafer tape conveyor frame 222 indicating the exact location to which the wafer tape 218 should be conveyed in order to perform the transfer operation. Sensor 244 may be one of many types of sensors, or a combination of sensor types to better perform multiple functions. Sensor 244 may include, but is not limited to: a laser range finder, or an optical sensor, such as a non-limiting example of a high-definition optical camera having micro photography capabilities.

Moreover, in an embodiment, a second sensor 246 may also be included in apparatus 200. The second sensor 246 may be disposed with respect to the product substrate 210 so as to detect the precise position of the circuit trace 212 on the product substrate 210. This information may then be used to determine any positional adjustment needed to align the product substrate 210 between the transfer mechanism 206 and the fixing mechanism 208 so that the next transfer operation occurs in the correct location on the circuit trace 212. This information may further be relayed to the apparatus 200 to coordinate conveying the product substrate 210 to a correct position, while simultaneously conveying instructions to the wafer tape conveyor frame 222. A variety of sensors are also contemplated for sensor 246 including optical sensors, such as one non-limiting example of a high-definition optical camera having micro photography capabilities.

FIGS. 2A and 2B further illustrate that the first sensor 244, the second sensor 246, and the laser 236 may be grounded. In an embodiment, the first sensor 244, the second sensor 246, and the laser 236 may all be grounded to the same ground (G), or alternatively, to a different ground (G).

Depending on the type of sensor used for the first and second sensors 244, 246, the first or second sensors may further be able to test the functionality of transferred dies. Alternatively, an additional tester sensor (not shown) may be incorporated into the structure of apparatus 200 to test individual dies before removing the product substrate 210 from the apparatus 200.

Furthermore, in an example embodiment, multiple independently-actuatable needles and/or lasers may be implemented in a machine in order to transfer and fix multiple dies at a given time. The multiple needles and/or lasers may be independently movable within a three-dimensional space. Multiple die transfers may be done synchronously (multiple needles going down at the same time), or concurrently but not necessarily synchronously (e.g., one needle going down while the other is going up, which arrangement may balance better the components and minimize vibration). Control of the multiple needles and/or lasers may be coordinated to avoid collisions between the plurality of components. Moreover, in other examples, the multiple needles and/or lasers may be arranged in fixed positions relative to each other.

Basic Example Product Substrate

Figure 3:
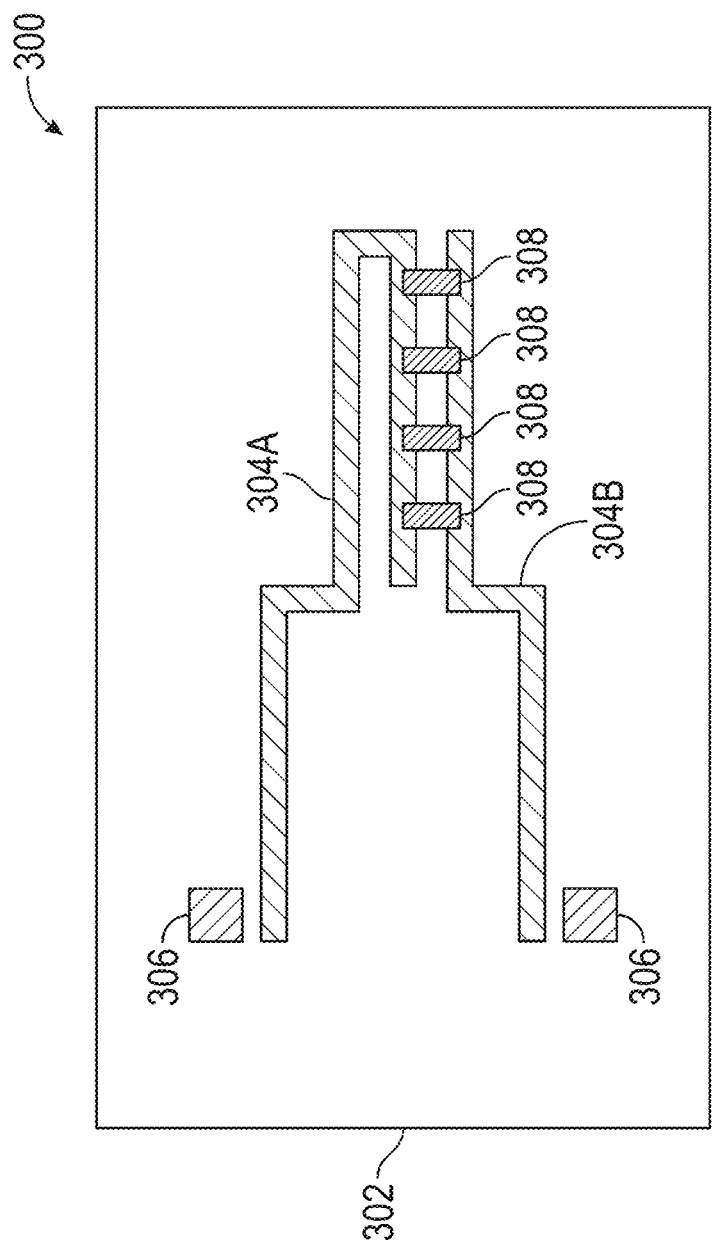
FIG. 3 illustrates a plan view of an embodiment of a basic product substrate having multiple semiconductors attached to the substrate via a circuit trace according to an embodiment of this application.

FIG. 3 illustrates an example embodiment of a processed product substrate 300. A product substrate 302 may include a first portion of a circuit trace 304A, which may perform as a negative or positive power terminal when power is applied thereto. A second portion of the circuit trace 304B may extend adjacent to the first portion of the circuit trace 304A, and may act as a corresponding positive or negative power terminal when power is applied thereto.

As similarly described above with respect to the wafer tape, in order to determine where to convey the product substrate 302 to perform the transfer operation, the product substrate 302 may have a bar code (not shown) or other identifier, which is read or otherwise detected. The identifier may provide circuit trace data to the apparatus. The product substrate 302 may further include datum points 306. Datum points 306 may be visual indicators for sensing by the product substrate sensor (for example, second sensor 246 in FIG. 2) to locate the first and second portions of the circuit trace 304A, 304B. Once the datum points 306 are sensed, a shape and relative position of the first and second portions of the circuit trace 304A, 304B with respect to the datum points 306 may be determined based on preprogrammed information. Using the sensed information in connection with the preprogrammed information, the product substrate conveyance mechanism may convey the product substrate 302 to the proper alignment position for the transfer operation.

Additionally, dies 308 are depicted in FIG. 3 as straddling between the first and second portions of the circuit trace 304A, 304B. In this manner, the electrical contact terminals (not shown) of the dies 308 may be bonded to the product substrate 302 during a transfer operation. Accordingly, power may be applied to run between the first and second portions of the circuit trace 304A, 304B, and thereby powering dies 308. For example, the dies may be unpackaged LEDs that were directly transferred from a wafer tape to the circuit trace on the product substrate 302. Thereafter, the product substrate 302 may be processed for completion of the product substrate 302 and used in a circuit or other final product. Further, other components of a circuit may be added by the same or other means of transfer to create a complete circuit, and may include control logic to control LEDs as one or more groups in some static or programmable or adaptable fashion.

Example Direct Transfer Method

Figure 4:
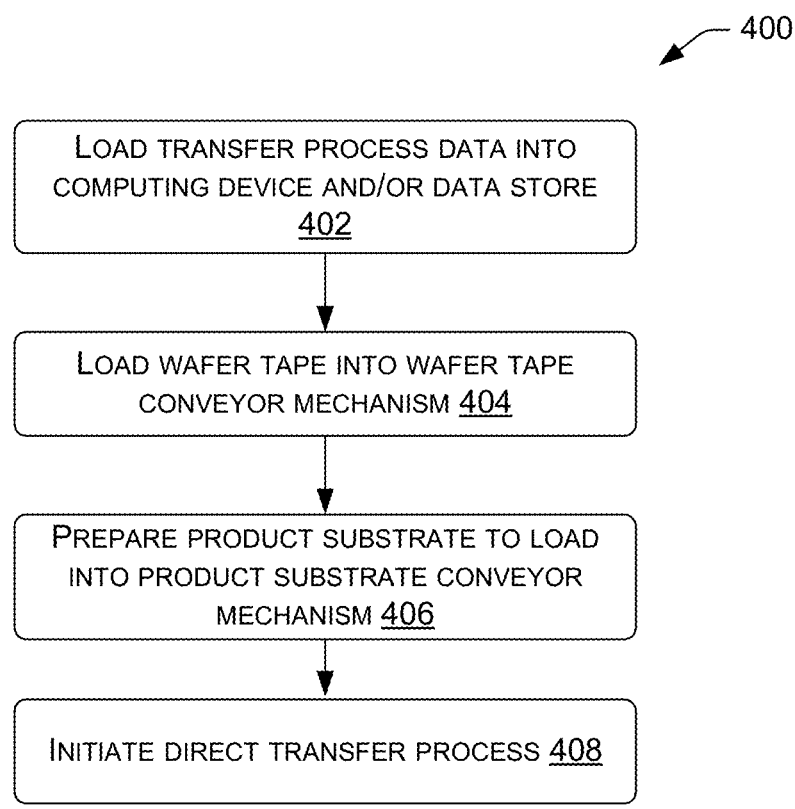
FIG. 4 illustrates a method of a die transfer process according to an embodiment of this application.

A method 400 of executing a direct transfer process, in which one or more dies is directly transferred from a wafer tape to a product substrate, is illustrated in FIG. 4. The steps of the method 400 described herein may not be in any particular order and as such may be executed in any satisfactory order to achieve a desired product state. The method 400 may include a step of loading transfer process data into a PC and/or a data store 402. The transfer process data may include data such as die map data, circuit CAD files data, and needle profile data.

A step of loading a wafer tape into a wafer tape conveyor mechanism 404 may also be included in method 400. Loading the wafer tape into the wafer tape conveyor mechanism may include controlling the wafer tape conveyor mechanism to move to a load position, which is also known as an extract position. The wafer tape may be secured in the wafer tape conveyor mechanism in the load position. The wafer tape may be loaded so that the dies of the semiconductor are facing downward toward the product substrate conveyor mechanism.

The method 400 may further include a step of preparing the product substrate to load into the product substrate conveyor mechanism 406. Preparing the product substrate may include a step of screen printing a circuit trace on the product substrate according to the pattern of the CAD files being loaded into the PC or data store. Additionally, datum points may be printed onto the circuit substrate in order to assist in the transfer process. The product substrate conveyor mechanism may be controlled to move to a load position, which is also known as an extraction position, whereat the product substrate may be loaded into the product substrate conveyor mechanism. The product substrate may be loaded so that the circuit trace faces toward the dies on the wafer. In an embodiment, for example, the product substrate may be delivered and placed in the load position by a conveyor (not shown) or other automated mechanism, such as in the style of an assembly line. Alternatively, the product substrate may be manually loaded by an operator.

Once the product substrate is properly loaded into the product substrate conveyor mechanism in the wafer tape is properly loaded into the wafer tape conveyor mechanism, a program to control the direct transfer of the dies from the wafer tape to the circuit trace of the product substrate may be executed via the PC to commence the direct transfer operation 408.

First Example Embodiment of a Display Backlighting Apparatus

Figure 5:
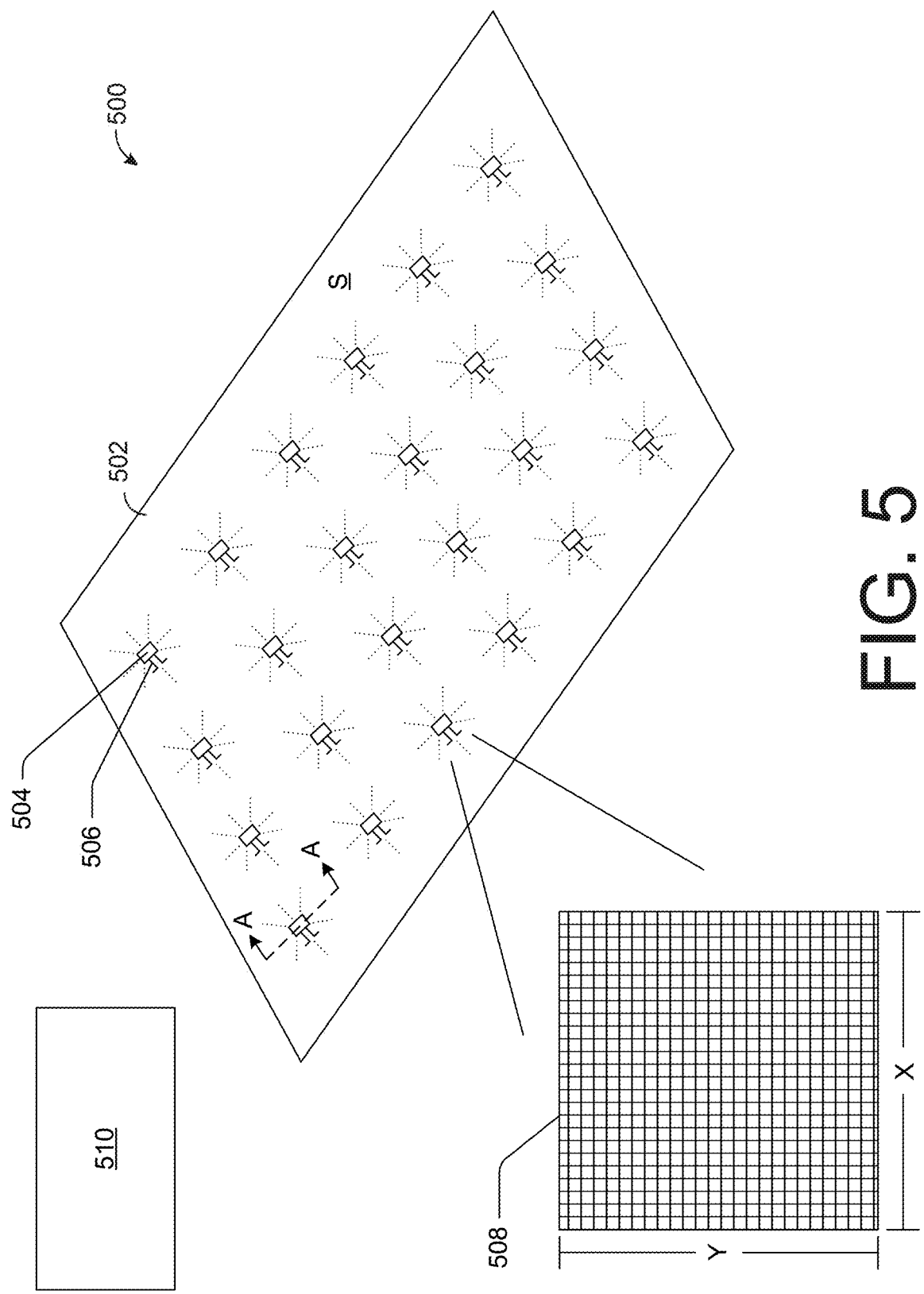
FIG. 5 illustrates an embodiment of a display backlighting apparatus according to an embodiment of this application.

An embodiment of a backlighting apparatus 500 is depicted in FIG. 5. In an embodiment, backlighting apparatus 500 may include a substrate 502 (e.g., circuit substrate) having light sources 504 that are connected thereto via a conductive trace 506. Substrate 502 may be a single layer of a material or may be formed of a plurality of layers of one or more materials. Similar to product substrate 210 discussed above, the materials from which substrate 502 may be selected may include, but are not limited to: a paper or polymer substrate formed as a sheet, where the polymer—translucent or otherwise—may be selected from any suitable polymers, including, but not limited to, silicone, acrylic, polyester, polyimide, polycarbonate, etc.; a circuit board (such as a printed circuit board (PCB)); etc. Furthermore, the material may include durable materials, flexible materials, rigid materials, and other materials with which the transfer process is successful and which maintain suitability for end use, such as a backlighting apparatus.

Light sources 504 may include one or more packaged or unpackaged LEDs and/or other suitable light generating devices. That is, a light source 504 (or also called a light source node herein) may be regarded as either a single light generating device as point source of light, or as a group of point sources of light, so closely spaced to appear as a unitary point source of light that is distinguishable from adjacent point sources of light. In an embodiment, micro-sized, unpackaged LEDs may be suitable for the embodiment described herein, as the use thereof may present several advantages compared to the use of conventional packaged LEDs. For example, a micro-sized, unpackaged LED such as those described above may have approximate dimensions ranging from about 12 microns to 400 microns in height and lateral width/length dimensions ranging from about 20 microns to about 800 microns. Some advantages of a micro-sized, unpackaged LED may include decreased cost of components, decreased size and/or weight, and/or thickness of a display device in which the described backlighting apparatus is implemented, increased power efficiency, and increased brightness of the display device.

Furthermore, in an embodiment, each light source 504 (e.g., one or more light generating devices in a group cluster as a "light source") may be individually addressable via an individualized circuit trace connected to and designed for the light source 504. In this manner, the light source(s) 504 may be discretely turned on or off, or have the power supply varied to create a more dynamic dimming effect locally or generally on a display device.

A light source 504 may be configured to illuminate a portion of an LCD display device, which portion may be defined as a block of pixels 508 having a predetermined size in the display. In an embodiment, the size of the block of pixels 508 may be described by the number of pixels (e.g., X times Y, where X and Y represent a number of pixels in the horizontal and vertical directions, respectively, and where X may be equal to Y) in the block of pixels 508 illuminated by a light source 504, which may include only a single pixel (i.e., X=Y=1) or may be thousands or tens of thousands or more, for example. In other instances, the size of the block of pixels may be described in terms of the size of a unit area of substrate 502 that contains a single light source 504, for which the number of pixels illuminated may be determined, at least in part, based on the resolution or PPI (pixels per inch) of the particular backlit display device in which the backlighting apparatus 500 is implemented. In an example embodiment of a block of pixels 508 illuminated by a light source 504, the unit area of substrate 502 may be as large as a 3 inch by 3 inch square (3 in$^2$). To further illustrate, for an example 65" LCD display device having a total screen resolution of approximately 3840 pixels by 1260 pixels, a single light source 504 may be assigned to illuminate a block of pixels containing as many as 72,900 pixels or more. Alternatively, the light source 504 may be designated to illuminate a smaller block of pixels having about 256 pixels to over 17,000 pixels, or from about 4,096 pixels to 8,192 pixels, for example. In the specific sized example above, as the number of pixels in the block decreases, the size of the unit area decreases as well so that the light from the light source within the unit area may be more directly concentrated on illuminating the smaller block of pixels, thereby increasing brightness capabilities per pixel.

Note, some wide ranges and some more narrow ranges of the number of pixels in a block are provided above. However, it is understood that due to the variability in the cost of manufacturing different qualities of displays (e.g., different levels of brightness, clarity, size, different size of pixels, different display resolutions, etc.) to provide a variety of price points for different consumers and different devices that use a backlit LCD display, a specific number of pixels in a block of pixels or a specific size of a unit area is difficult, at best, to describe precisely on a generic level. Furthermore, unless the light emitted from a light source is blocked to limit the illumination to a designated block of pixels, it is likely that a portion of the light may bleed across a desired unit area into adjacent areas, thereby increasing illumination of additional pixels outside of the designated block of pixels and affecting the brightness in the adjacent areas to some extent. As such, various economic, size, quality, and manufacturing factors may influence the number of pixels in a block of pixels illuminated by a single light source. In view of the above-described challenges to define the size of a block of pixels, an alternative manner of describing the backlighting of an LCD display may include determining a ratio of the total number of light sources compared to the total number of pixels.

Regardless of how the number of pixels in a block of pixels is determined, conventional backlit LCD displays generally use packaged LEDs for backlighting as well as an optical lens on the light sources to help focus the light emitted, which packaging and lens thereby increase a size, thickness, power consumption, etc. of the display. However, when implementing the unpackaged, micro-sized LEDs in a backlighting apparatus like the embodiments described herein, a backlit LCD display device may be smaller, thinner, more power efficient, etc. That is, a backlit LCD display device may include a substrate 502 having a light source 504, such as one or more micro-sized, unpackaged LEDs, that effectively illuminates a block of pixels 508 ranging from as low as 1 pixel per light source 504 to many thousands or more in a single unit area, without adding a lens thereon. Further, the backlighting apparatuses described herein may be manufactured at a cost significantly less than the cost of conventional LCD displays having comparable qualitative features such as overall brightness level, contrast performance, sharpness, etc.

Due at least in part to the lower cost of micro-sized, unpackaged LEDs and manufacturing capabilities, a unit area of substrate 502 in backlighting display apparatus 500 that implements light sources 504 may include a larger quantity of brighter and/or more efficient light sources 504 than an equivalent unit area of a conventional backlighting apparatus substrate implementing an array of conventional packaged LEDs. Thus, according to features of embodiments in the instant application, the light sources 504 may be more densely distributed (compared to the conventional apparatus) across a surface area of the substrate 502, thereby enabling greater brightness and better localized dimming. In an embodiment, adjacent light sources 504 may be spaced not more than 5 mm apart. In other instances, a manufacturer may choose to space the adjacent light sources 504 more than 5 mm apart while diffusing and distributing light more effectively and minimizing the thickness of the display device.

In contrast, while a manufacturer of a conventional backlit LCD display device may try to increase the quantity of light sources in the conventional backlighting apparatus, conventional display devices frequently encounter overheating challenges and require additional space (i.e., increased thickness) above the light sources for adequate light diffusion and to accommodate the greater height of conventional packaged LEDs. As such, a mere increase in the number of conventional light sources cannot achieve the same benefits of the thinner display achieved by the embodiments of the instant application.

Turning back to other features of backlighting apparatus 500, substrate 502 may include a reflective surface S. In an embodiment, surface S of substrate 502 to which light sources 504 are attached may have a coating or layer that is reflective. For example, surface S may be covered with a white or shiny, metallic coating or film. Additionally, and/or alternatively, substrate 502 may be made of a material that has a reflective property. Such a reflective surface may increase the amount of light that is emitted toward the display surface and minimize light loss.

Further, device 510 represents a device in which the backlighting apparatus 500 may be implemented, including but not limited to: a television display, a smartphone display, a tablet display, a computer screen display, a watch display, etc.

Figure 6:
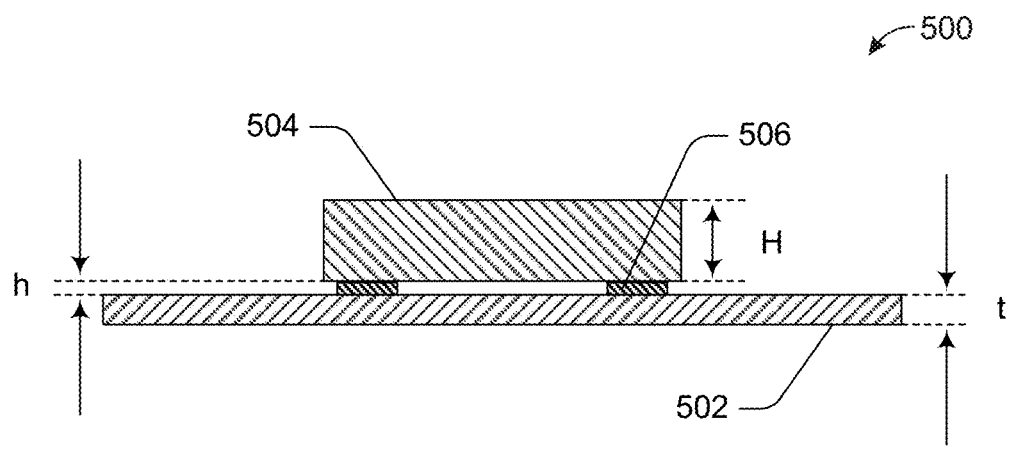
FIG. 6 illustrates a cross-sectional view of a display backlight on the display backlighting apparatus of FIG. 5 taken at line A-A according to an embodiment of this application.

In FIG. 6, a cross-sectional side view is depicted of a portion of backlighting apparatus 500 taken at line A-A. FIG. 6 shows a light source 504 having a height (H) connected via circuit trace 506 having a height (h) to substrate 502 having a thickness (t). In an embodiment, as discussed above, height H of light source 504 may range from about 12 microns to about 200 microns; height h of circuit trace 506 may range from about 5 microns to about 40 microns; and thickness t of substrate 502 may range from about 12 to about 775 microns. Therefore, an overall thickness (H+h+t) of the backlighting apparatus 500 may be from about 29 microns to about 1025 microns.

Figure 7:
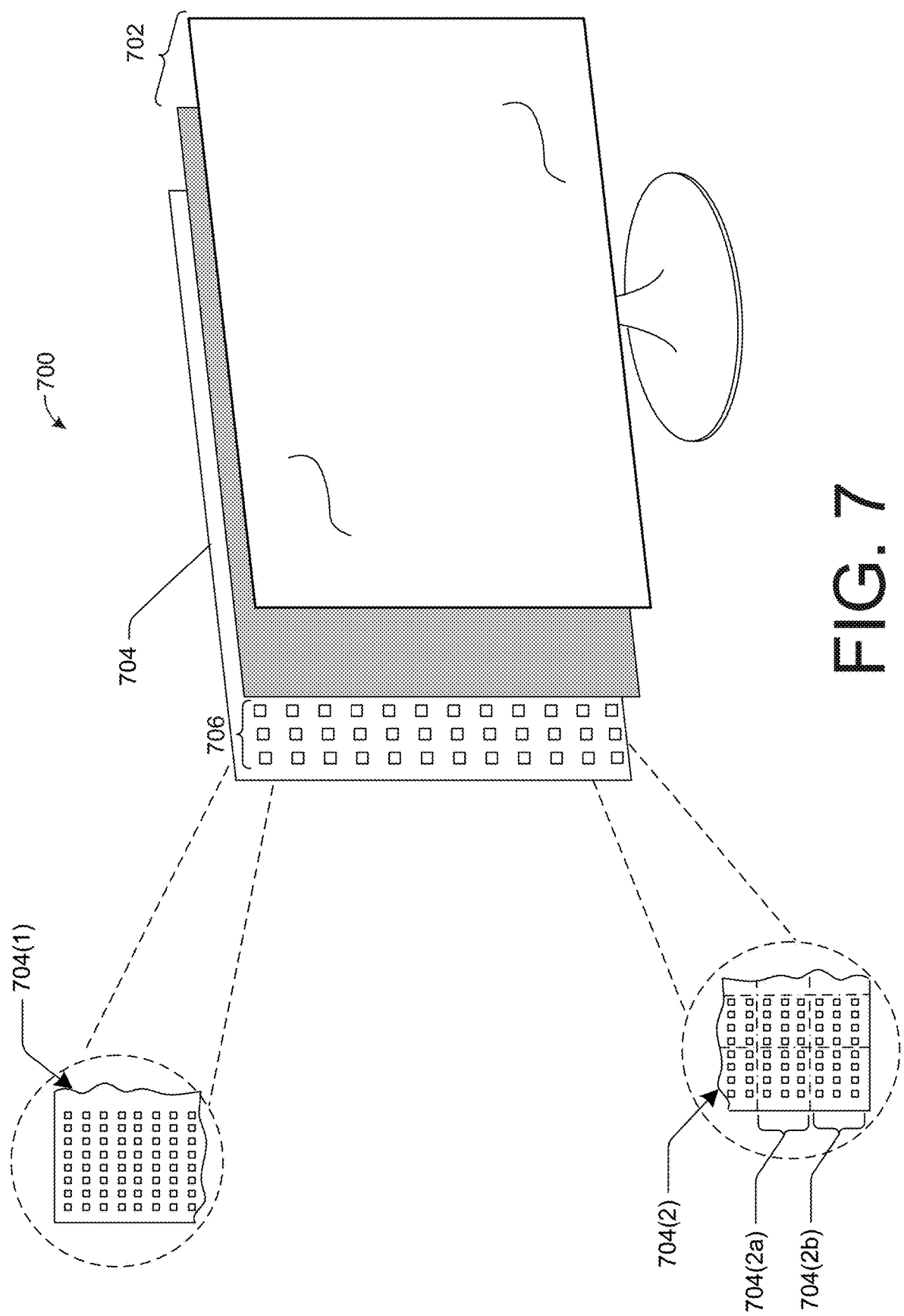
FIG. 7 illustrates a perspective view of an example display device using the display backlighting apparatus technology discussed herein, showing layering of components, according to an embodiment of this application.

FIG. 7 depicts an example embodiment of a backlit LCD display apparatus 700 (e.g., television, monitor, display screen, etc.). The backlit LCD display apparatus 700 may include one or more sequential optical substrates 702, such as a glass protection layer, an LCD layer, a polarizer layer, a light diffusion layer, etc. For convenience, FIG. 7 depicts two distinct "layers" as representative of the multiple possible optical substrates 702. The backlit LCD display apparatus 700 may further include a backlighting apparatus layer 704, having an array of a plurality of light sources 706, such as micro-sized, unpackaged LEDs. Note that the light sources 706 may not be depicted to scale with respect to the display screen size.

Although the array of light sources 504 and 706, as seen in FIGS. 5 and 7, respectively, appear to be uniformly distributed in uniform density across the surface of their respective circuit substrates, it is contemplated as shown in FIGS. 8-11 that other predetermined array patterns are viable. That is, the distribution of light sources may not be uniformly dense across the substrate.

Furthermore, in an embodiment, the backlighting apparatus layer 704 may be formed with a unitary substrate 704(1) that extends continuously across an entirety of the display apparatus 700. Additionally, and/or alternatively, a composite substrate 704(2) may be implemented as backlighting apparatus layer 704, formed using a predetermined number of a plurality of smaller sections of substrates 704(2a), 704(2b) (as indicated by the dashed lines), which are arranged and/or interconnected with respect to each other to act in concert as a single backlighting apparatus layer 704. Composite substrate 704(2) may be advantageous for larger LCD displays, where it is impractical to manufacture a single massive substrate, for example.

Figure 8:
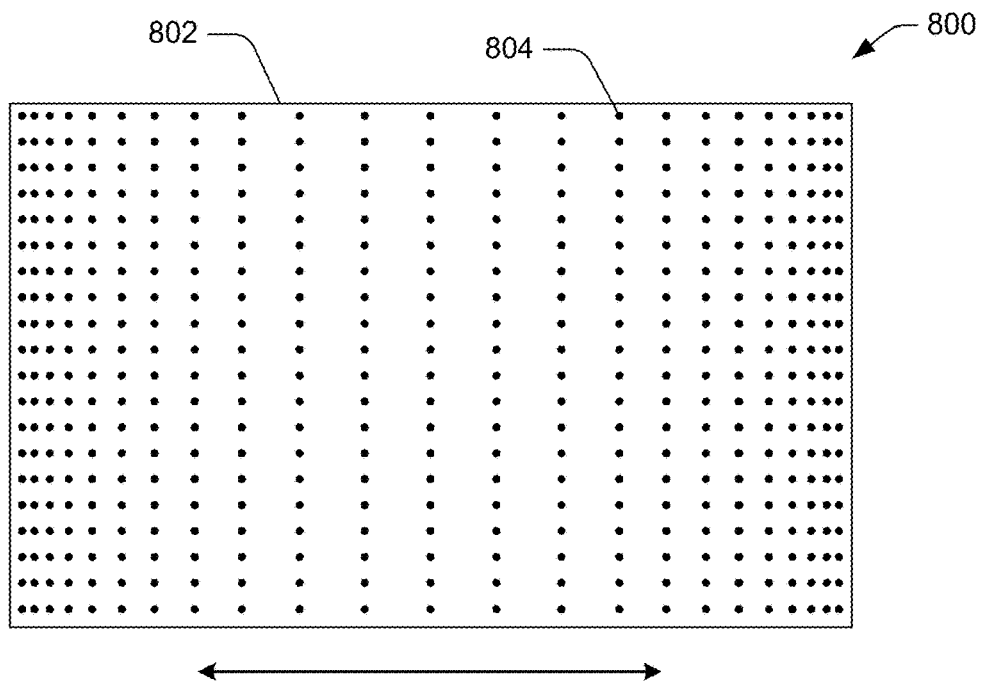
FIG. 8 illustrates a planar view of a display backlighting apparatus according to an embodiment of this application.
Figure 9:
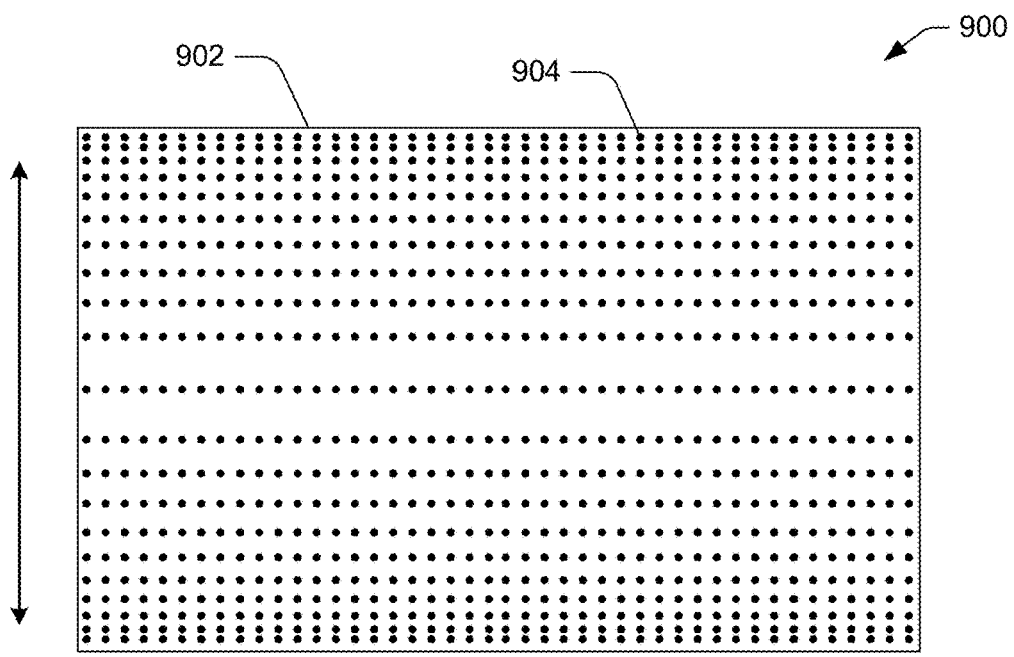
FIG. 9 illustrates a planar view of a display backlighting apparatus according to an embodiment of this application.

In an embodiment, light sources may be distributed as shown in FIG. 8. That is, in backlighting apparatus 800, the substrate 802 has light sources 804 distributed such that the vertical spacing between adjacent light sources 804 may be approximately equal, while the horizontal spacing between adjacent light sources 804 may be greatest near a center of the substrate 802 and may decrease in horizontal distance between adjacent light sources 804 in opposite horizontal directions away from the center, as indicated by the horizontal arrows. Similarly, light sources may be distributed as shown in FIG. 9. That is, in backlighting apparatus 900, the substrate 902 has light sources 904 distributed such that the horizontal spacing between adjacent light sources 904 may be approximately equal, while the vertical spacing between adjacent light sources 904 may be greatest near a center of the substrate 902 and may decrease in vertical distance between adjacent light sources 904 in opposite vertical directions away from the center, as indicated by the vertical arrows. Embodiments of substrates with spacing such as is described above and depicted in FIGS. 8 and 9 may further minimize cost of manufacturing by providing fewer light sources overall, while concentrating the light sources more heavily in the edges of the displays where greater contrast may be beneficial. Further, by increasing the density of the light sources near the edges of the display, the display can be thinner near the edges because the light does not require as much dispersion. Thus, the display can be thicker in the center, which may reduce the cost of manufacturing an otherwise uniformly thin display.

Figure 10:
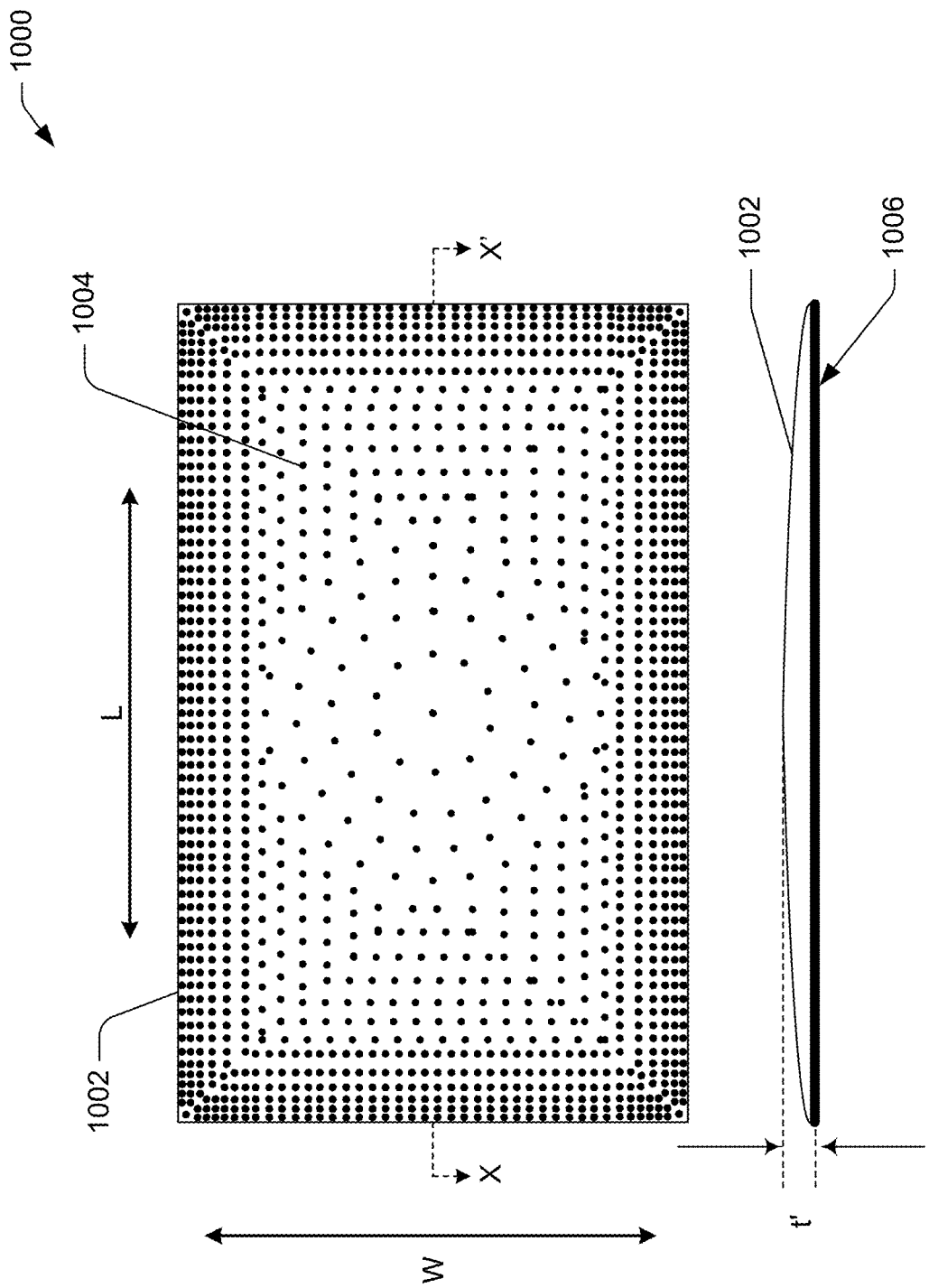
FIG. 10 illustrates a planar view and a cross-sectional view of a display backlighting apparatus according to an embodiment of this application.

Additionally, and/or alternatively, light sources may be distributed as shown in FIG. 10. That is, in backlighting apparatus 1000, substrate 1002 has light sources 1004 distributed such that the amount of the distance of the vertical spacing and the horizontal spacing between adjacent light sources 1004 may be greatest near a center of substrate 1002 and may decrease in horizontal distance and vertical distance between adjacent light sources 1004 in opposite horizontal directions (L) and opposite vertical directions (W) away from the center, as indicated by the horizontal arrows and the vertical arrows. That is, the light source density decreases approaching the center of substrate 1002.

Moreover, in the cross-sectional view of backlighting apparatus 1000 taken at line X-X', FIG. 10 depicts a thickness (t') of the air gap between a front surface of substrate 1002 (including the height of the light sources 1004 thereon) and the back of the one or more optical substrates 1006 of the display device. (Note, optical substrates 1006 are only depicted in the cross-sectional view for clarity.) The thickness t' of the air gap may vary from a center of substrate 1002 toward outer edges, both laterally (as shown) and vertically (not shown). Inasmuch as there are fewer light sources 1004 near the center of substrate 1002, the thickness t' of the air gap may be greater at the center of the display due to the possibility that a light source 1004, which is spaced relatively further apart from adjacent light sources, may need additional distance from the optical substrates to diffuse sufficiently to avoid a bright spot showing through optical substrate(s) 1006. Correspondingly, due to the greater density of light sources 1004 near the edges of substrate 1002, the thickness t' of the air gap at the edges of the display in which backlighting apparatus 1000 is implemented may be thinner than at the center.

Figure 11:
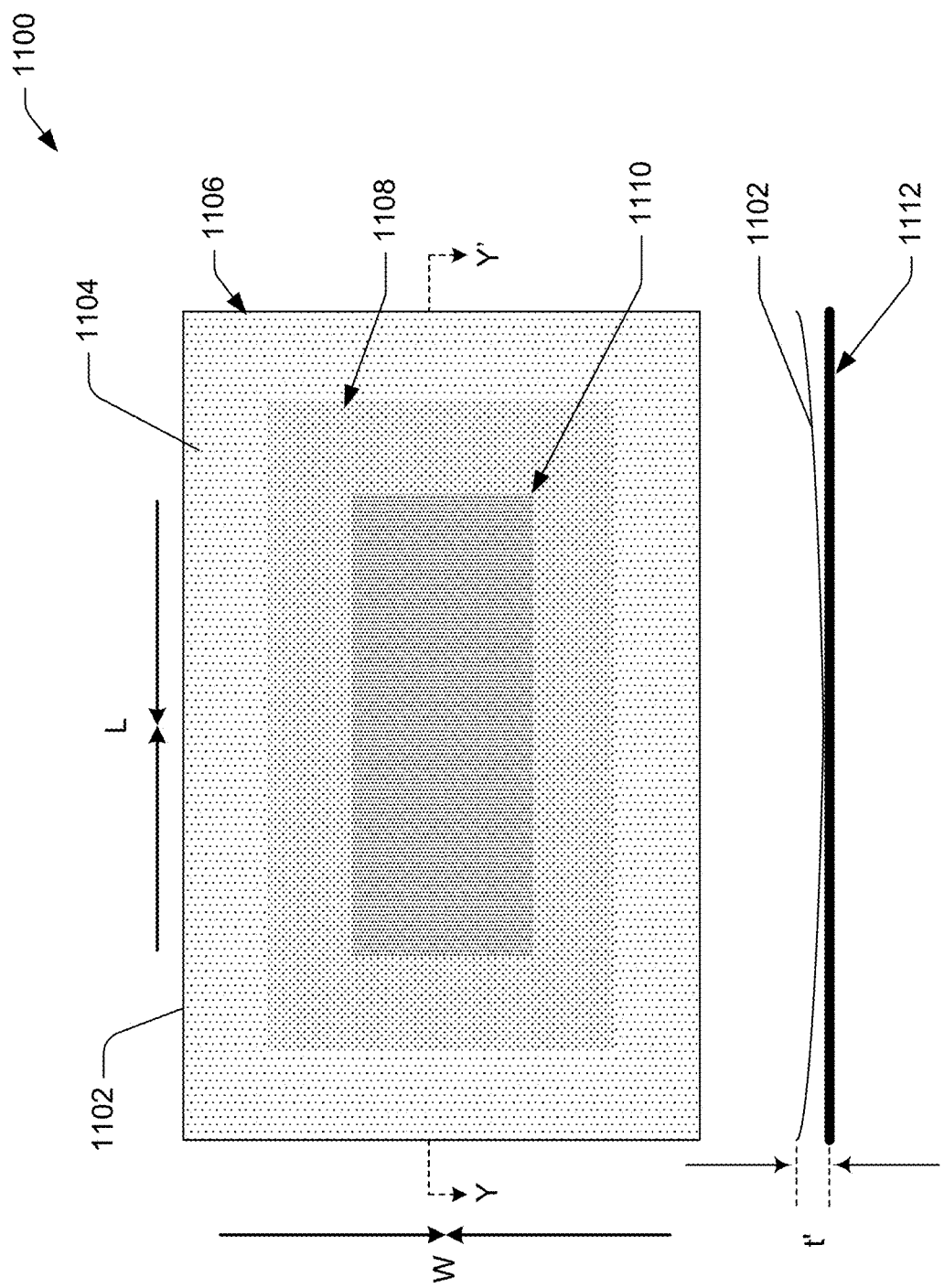
FIG. 11 illustrates a planar view and a cross-sectional view of a display backlighting apparatus according to an embodiment of this application.

Additionally, and/or alternatively, light sources may be distributed as shown in FIG. 11. Specifically, in backlighting apparatus 1100, substrate 1102 has light sources 1104 distributed such that the amount of the distance of the vertical spacing and the horizontal spacing between adjacent light sources 1104 may be greatest near the edges of substrate 1102 (in section 1106, for example), and may decrease in horizontal distance and vertical distance between adjacent light sources 1104 in opposite horizontal directions (L) and opposite vertical directions (W) toward the center, as indicated by the horizontal arrows and the vertical arrows. That is, the light source density, as depicted in sections 1108 and 1110, respectively, increases approaching the center of the substrate 1102. Note, the density of light sources may change gradually as depicted in FIG. 10, for example, or, the density of light sources may change abruptly in a transition from distinct sections, as depicted in FIG. 11, for example.

Moreover, in the cross-sectional view of backlighting apparatus 1100 taken at line Y-Y', FIG. 11 depicts a thickness (t') of the air gap between a front surface of substrate 1102 (including the height of the light sources 1104 thereon) and the back of the one or more optical substrates 1112 of the display device. (Note, optical substrates 1112 are only depicted in the cross-sectional view for clarity.) The thickness t' of the air gap may vary from a center of substrate 1102 toward outer edges, both laterally (as shown) and vertically (not shown). Inasmuch as there are fewer light sources 1104 near the edges of substrate 1102, the thickness t' of the air gap may be greater at the edges due to the possibility that a light source 1104 may need additional space to diffuse sufficiently to avoid a bright spot showing through optical substrate(s) 1112. Correspondingly, due to the greater density of light sources 1104 near the center of substrate 1102, the thickness t' of the air gap may be thinner at the center than near the edges.

As stated with respect to FIG. 7, the substrate used for the backlighting apparatus may be a unitary, continuous substrate, or it may be a composite substrate. As applied to the light source arrangements depicted in FIGS. 8-11, it is noted that when using a composite substrate, a density and placement determination may be made in advance so as to create the smaller substrate sections with the proper variance of horizontal and vertical spacing between adjacent light sources, according to the location in which the respective substrate sections will be ultimately assembled in the backlighting apparatus.

Figure 12:
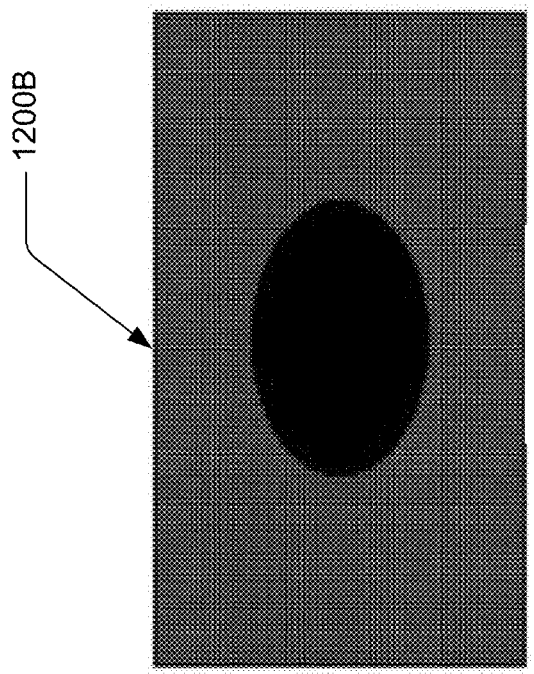
FIG. 12 illustrates a comparison of dimming capabilities of a display apparatus using conventional techniques and components to a display apparatus using techniques and components as described herein.
Figure 12:
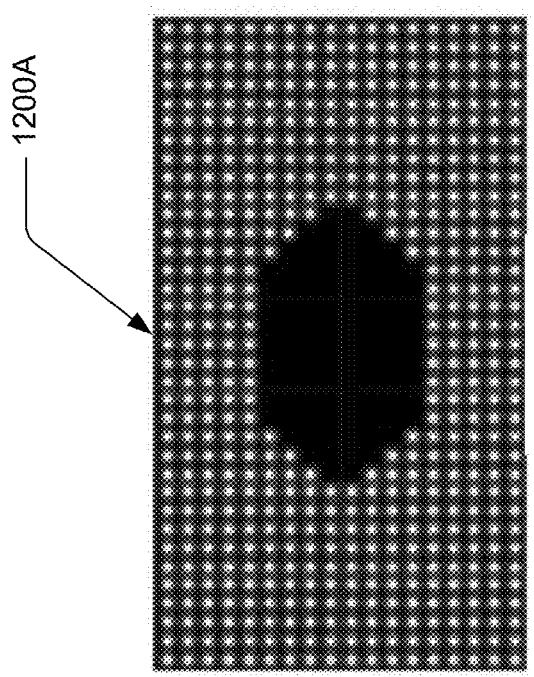

FIG. 12 depicts a comparison of the dimming capabilities available on a display apparatus 1200A using techniques and components of the conventional method of manufacture and the dimming capabilities of a display apparatus 1200B using techniques and components for backlighting as discussed herein above. That is, display apparatus 1200A shows an approximation of display screen dimming/contrast capabilities (darkening of a portion of the display screen to provide greater contrast and sharpness in coloration of the display screen). Note that the illuminated light sources used in display apparatus 1200A are indicated by distinguishable white dots on the blackened screen and the center of the screen may include unilluminated conventional light sources (e.g., packaged LEDs). Further, assuming a signal provided to the backlighting indicated that a center portion of the screen should be darkened, note the generally hexagonal shape displayed with jagged-appearing sides. The jagged appearance of the sides is due to the relatively large distance between light sources compared to the size of the display.

In display apparatus 1200B, however, assuming the same signal was provided as was provided to conventional display apparatus 1200A, the sides of the center portion that is darkened appear to form a generally ovular shape with a smoother perimeter. Thus, display apparatus 1200B may display a sharper and more defined display with higher dimming/contrast capabilities due to the implementation of micro-sized light sources, such as the micro-sized, unpackaged LEDs discussed herein above. As previously indicated, the use of micro-sized light sources allows a greater quantity of light sources to be used at a lower cost and more efficient energy consumption. Further, more of the light sources may be placed closer together such that from the same viewing distance, display apparatus 1200B may be brighter and have sharper images created by higher control over localized dimming of the light sources.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter. Furthermore, the use of the term "may" herein is used to indicate the possibility of certain features being used in one or more various embodiments, but not necessarily in all embodiments.

What is claimed is:

1. A backlighting apparatus for an LCD display, the backlighting apparatus comprising:
   a product substrate;
   a circuit trace disposed on a surface of the product substrate;
   a plurality of light sources affixed to the product substrate via the circuit trace in a predetermined pattern across the surface of the product substrate, the plurality of light sources including a plurality of micro-sized, unpackaged LEDs;
   an optical substrate; and
   an air gap between the product substrate and the optical substrate, the air gap having a thickness that varies from a center of the product substrate toward at least one edge of the product substrate and across an area of the product substrate where the plurality of light sources are affixed,
   wherein the predetermined pattern of the plurality of light sources affixed to the product substrate includes the plurality of light sources distributed along a first surface of the product substrate closest to the optical substrate such that a density of the plurality of light sources varies with a distance from the center of the product substrate to the at least one edge of the product substrate symmetrically in at least two directions from the center of the product substrate, and
   wherein the density of the plurality of light sources varies in a plurality of sections of uniform density across the across the area of the product substrate where the plurality of light sources are affixed.

2. The backlighting apparatus of claim 1, wherein a material of the product substrate includes one of: polyester, acrylic, glass, polyimide, or polycarbonate.

3. The backlighting apparatus of claim 1, wherein at least one of the plurality of LEDs is affixed to the product substrate via a direct transfer process in which the at least one of the plurality of LEDs is transferred directly, via an automated mechanism, from a wafer tape to the circuit trace on the surface of the product substrate.

4. The backlighting apparatus of claim 1, wherein the LEDs of the plurality of light sources are individually addressable to be powered on and off, and to be varied in power level.

5. The backlighting apparatus of claim 1, wherein the density is greatest near the center of the product substrate.

6. The backlighting apparatus of claim 1, wherein the density is lowest near the center of the product substrate.

7. The backlighting apparatus of claim 1, wherein the at least two directions includes all cardinal directions.

8. A liquid-crystal display (LCD) display, comprising:
   a display assembly including one or more optical substrates; and
   a backlighting apparatus aligned with the display assembly, the backlighting apparatus including:
      a product substrate, and
      a plurality of light sources affixed to the product substrate in a predetermined pattern across a surface of the product substrate, the plurality of light sources including a plurality of micro-sized, unpackaged LEDs that are configured to provide illumination for a block of pixels in the LCD display; and
   an air gap between the product substrate and the display assembly,
   wherein the air gap has a thickness that varies from a center of the product substrate toward at least one edge of the product substrate,
   wherein the predetermined pattern of the plurality of light sources affixed to the product substrate includes the plurality of light sources distributed along a first surface of the product substrate closest to the display assembly such that a density of the plurality of light sources varies with a distance from the center of the product substrate to the at least one edge of the product substrate symmetrically in at least two directions from the center of the product substrate, and
   wherein the thickness of the air gap between the product substrate and the display assembly increases from the center of the display assembly outward to the at least one edge of the display assembly.

9. The LCD display of claim 8, wherein the plurality of light sources are arrayed in columns and rows across the product substrate.

10. The LCD display of claim 9, wherein an amount of space between adjacent columns of the plurality of light sources, respectively, increases in a direction from opposing lateral sides of the LCD display toward a center of the LCD display.

11. The LCD display of claim 9, wherein an amount of space between adjacent rows of the plurality of light sources, respectively, increases from opposing sides of the LCD display toward the center of the LCD display.

12. The LCD display of claim 8, wherein the density of the plurality of light sources is greatest near the center of the product substrate.

13. The LCD display of claim 8, wherein the density of the plurality of light sources is lowest near the center of the product substrate.

14. The LCD display of claim 8, wherein the density of the plurality of light sources varies in a plurality of sections of uniform density.

15. A device having a liquid-crystal display (LCD) display, the device comprising:
   a backlighting component including:
      a circuit substrate, and a plurality of micro-sized, unpackaged LEDs arranged in an array of distributed light source nodes on the circuit substrate, wherein, a power state of the light source nodes being individually addressable, the light source nodes configured to provide illumination for a block of pixels of the LCD display, and an optical substrate; and an air gap between the optical substrate and the circuit substrate, the air gap having a thickness varying from a center of the circuit substrate toward edges of the circuit substrate and across an area of the circuit substrate where the light source nodes are affixed, wherein the array of distributed light source nodes includes the light source nodes distributed along a first surface of the circuit substrate closest to the optical substrate such that a density of the light source nodes varies with a distance from the center of the circuit substrate to the edges of the circuit substrate symmetrically in at least two directions from the center of the circuit substrate, and wherein the density of the light source nodes varies in a plurality of sections of uniform density across the across an area of the circuit substrate where the light source nodes are affixed.

16. The device of claim 15, wherein the device is one of a television, a smartphone, a tablet, a computer screen, or a watch.

17. The device of claim 15, further comprising a circuit trace that connects the LEDs to the circuit substrate, wherein the circuit trace includes a conductive ink.

18. The device of claim 15, wherein an overall thickness of the backlighting component is from 29 microns to 1025 microns.

* * * * *